June 26, 1962        A. M. SAREM        3,040,570
FLOW RATE MEASURING DEVICE
Filed July 5, 1960
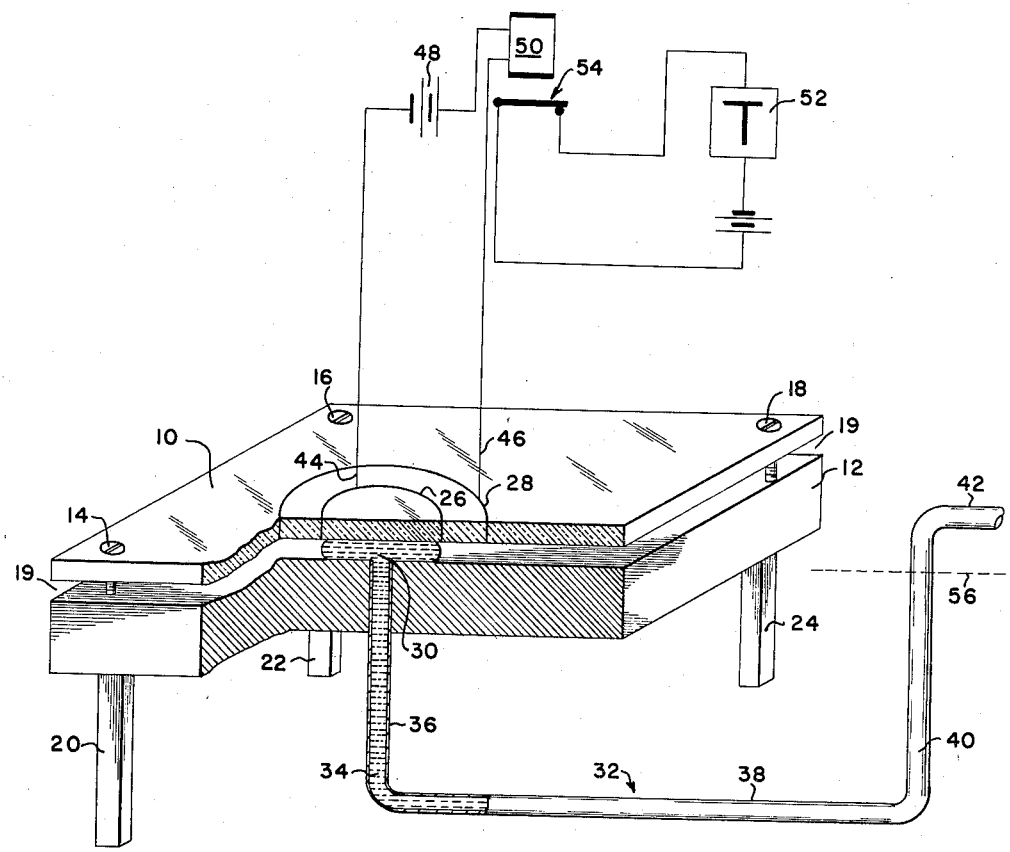
INVENTOR
AMIR M. SAREM
BY Adams, Forward & McLean
ATTORNEY

United States Patent Office 3,040,570
Patented June 26, 1962

3,040,570
FLOW RATE MEASURING DEVICE
Amir M. Sarem, Tulsa, Okla., assignor, by mesne assignments, to Sinclair Research, Inc., New York, N.Y., a corporation of Delaware
Filed July 5, 1960, Ser. No. 40,650
9 Claims. (Cl. 73—194)

This invention relates to a means of measuring the rate of flow of fluids. More particularly, the apparatus of this invention provides a means for measuring extremely small rates of flow of liquids or gases, in the order of a fraction of a milliliter per day. Although the art has developed many devices for measuring the rate of flow of fluids, a simple and rugged device for measuring these extremely low rates has not been found available. Such a device is of utility in studying, for example, the microscopic behavior of fluid flow in porous media, such as the flow of crude petroleum in an underground shale or other formation. Frequently portions of a formation to be studied are mined and brought to the laboratory to devise the best approach toward petroleum recovery from the formation and the flow rate of the petroleum is an important factor in the decisions made.

The apparatus of this invention makes use of a measuring liquid other than the test fluid. This measuring liquid is one which does not wet the parts of the apparatus which it contacts and which is immiscible with the fluid to be tested. Such a liquid may be, for example, liquid mercury, or certain silicone fluids. The apparatus basically comprises a pair of plates having smooth spaced-apart surfaces facing each other. At least one plate is a meter having circularly arranged indicia in the spaced-apart area. The measuring liquid moves in the space between the plates. The function of the meter plate is to indicate the start and the finish of the test, the time interval between the start and finish being used to calculate the rate of flow of the test fluid. Metering may be done simply by the use of a transparent meter plate—the start and finish of the test being determined visually by contact of the measuring liquid with circles engraved, painted or otherwise inscribed on the plate. By "transparent" is meant enough transparency to see the edge of the pool of liquid. Such inscription should be on the surface of the plate away from the space between the plates in order not to roughen the surface and perhaps cause inaccuracy in the readings. Alternatively or simultaneously, the indicia may be provided by other means such as electric contacts, one on each real or imaginary circle on the meter plate, which can give a visual or audible signal at the start and/or end of the test, or which may be wired to a timer or other recorder.

The invention can be better understood by the accompanying drawing which shows a perspective view of the device, partly cut away, with electrical features shown schematically. The drawing is not to be construed as limiting.

The device comprises the upper plate 10 and the lower plate 12 which may be held in a horizontal spaced-apart relationship by any suitable means, such as the screws 14, 16, 18 and others, not shown, leaving the space 19 between the plates. Although described as "plates" the members 10 and 12 may be of any suitable thickness. Also, as shown, the lower plate may be provided with the legs 20, 22, 24, etc. and the upper plate may rest on the lower plate except in the measuring area and such area is preferably open to the atmosphere.

The meter plate, in this embodiment the upper plate 10, may be made of a rigid transparent material such as glass, Lucite, etc., and is provided with at least two concentric circularly arranged indicia such as the circles 26, 28. The meter plate is arranged so that the common center of these circles is coaxial with an orifice 30 in the other plate. Leading to this orifice is a conduit 32 containing the measuring liquid 34. In the arrangement shown, the conduit 32 comprises a vertical leg 36 adjacent the orifice, a horizontal leg 38 and the external vertical leg 40. This external leg is connected to the conduit 42 for the test fluid which is conducted from a suitable source, such as a tap from a laboratory model of a subterranean petroliferous formation.

It will be observed from the drawing that the plates are horizontal and are spaced evenly apart; that is, they are in parallel planes. At the start of the test, the measuring liquid fills that portion of the space 19 which is within the inner circle 26. Flow of test fluid in the conduit 42 pushes the measuring liquid 34 ahead of it, through the legs 40, 38 and 36 and past the orifice 30. The pool of measuring liquid expands until gradually the edge of the pool reaches the outer circle 28 to mark the end of the test. The measuring liquid does not flow freely and therefore does not run off the edge of the plate, due to the smallness of the space 19 and the non-wetting characteristics of the measuring liquid toward the plates.

Alternatively or simultaneously, the meter plate 10 may be provided with electrodes 44 and 46, at the circles 26 and 28 respectively. The provision of these electrodes may obviate the need for a transparent meter plate and for actual visible circles. As shown, electrodes 44 and 46 may be electrically connected through the power source 48 and the solenoid 50. This arrangement, in conjunction with the use of mercury or other electrically conductive medium as the measuring liquid, provides for energizing the solenoid when the edge of the pool of mercury reaches the circle 28. Such energization may provide for opening the circuit of a timer 52 through the relay 54, or may instead close a circuit to a bell or lamp, not shown.

The device of the invention is kept level during the test and the fasteners 14, 16 and 18 are regulated to give even spacing of the plates. In order to overcome any possible effects of gravity, it is advisable to fill the conduit 32 fully with the measuring liquid at the start of the test up to a level in the leg 40 even with the height of the liquid in the leg 36. This level is indicated by the dashed line 56 in the drawing.

Although, as illustrated, the top plate serves as the meter and the orifice is provided in the other plate, either the top or bottom plate may be the meter and the orifice may be provided in the meter plate at the center of the circles. Also, one plate may be provided with visual indicia while the other has the electrodes.

As mentioned, the time necessary for the edge of the pool of measuring liquid to travel from the inner circle to the outer circle is measured. The flow rate may then be calculated from the formula:

$$q = \frac{\pi h}{4t}(D_2{}^2 - D_1{}^2)$$

where:

$q$ = flow rate, cc./sec.
$h$ = the space between the plates, in cm.
$t$ = time taken for mercury to disperse from the inner circle to the outer circle, sec.
$D_1$ = diameter of inner circle, cm.
$D_2$ = diameter of outer circle, cm.

The precision by which the flow rate may be measured is a function of the space 19 between plates 10 and 12, and the diameter of circles 26 and 28. The height of the space normally is quite small, say from .001" to .00001". The plates will generally be made of some material which has a low coefficient of linear expansion. A transparent material having this property is "Vycor" brand 96% silica glass which has a linear coefficient of expansion per degree centigrade of about $8 \times 10^{-7}$. A suitable non-transparent material is "Invar," a 34 to 36% nickel alloy which has a linear coefficient of expansion similar to "Vycor" glass.

A very limited coefficient of expansion gives the stability necessary to measure even minute flow variances in liquids.

The flexibility of this measuring device for adjustment to the required flow rates is excellent. One can change the sensitivity and capacity of this flow measuring device by changing the space between the top plate and the base or by varying the circles used in the measuring of flow rate. Also, another use of the apparatus of the present invention is to calibrate flow meters which cannot achieve the precision measurements of the flow meter of the present invention.

The apparatus of this invention is particularly applicable to measuring the flow of various fluid materials such as gas, petroleum liquids and the like. However, less viscous materials such as gasolines may be measured and recorded as desired so long as the rate of flow is small.

Mercury, when passed thorugh a small orifice say of less than one inch and into a space having an extremely limited height in the range of .0002" will flow in a uniform, generally circular pattern as to make extremely precise measurements possible when using the circles, real or imaginary, employed in the apparatus of the present invention.

It is understood, of course, that many and numerous changes may be made in the details and arrangements of the parts comprising the apparatus of this invention. For example, the measuring liquid may be presented to the orifice by any suitable means so long as the volume passing through the orifice during the test is equal to the volume of test fluid traveling during the test. The orifice and the space may be varied depending upon the material measured, the particular embodiment of the invention and the accuracy of measurement desired. Generally, the diameter of the orifice will be less than one inch. The means of holding the plates is dependent upon the specific embodiment selected, structural material available and the results desired, and thus may be substantially varied dependent upon the choices of the operator. Also, the size and placement of the circles is a matter of selective determination based upon the results desired, materials available, and the characteristics of the liquid to be measured, but in any event, there are at least two concentric circles inscribed or visualized or otherwise designated on the surface of the meter plate co-axial with the orifice in the other plate.

It is to be understood that the invention is not limited to the specific embodiments herein shown and described but may be varied according to the results desired.

I claim:

1. An apparatus for measuring the flow rate of a fluid comprising a pair of horizontal plates in parallel planes defining a space therebetween of very small height, one plate having at least two concentric circularly arranged indicia, an orifice in a plate opening into the said space at the center of the circular indicia and a conduit, provided with a measuring liquid which does not wet the plates, leading from said orifice to a source of flowing test fluid.

2. The apparatus of claim 1 in which the indicia are circles inscribed on a transparent plate.

3. The apparatus of claim 1 in which an electrode is positioned at the periphery of the indicia.

4. The apparatus of claim 1 in which the measuring liquid is mercury.

5. The apparatus of claim 4 in which the height of the space between the horizontal plates is about 0.00001 to 0.001 inch.

6. An apparatus for measuring the flow rate of a fluid comprising a pair of horizontal plates in parallel planes defining a space therebetween of very small height, one plate being transparent and having at least two concentrically arranged circles inscribed on it, an orifice in a plate opening into the said space coaxially with the center of the circles, and a conduit containing liquid mercury leading from said orifice to a source of flowing test fluid.

7. The apparatus of claim 6 in which the height of the space between the horiozntal plates is about 0.00001 to 0.001 inch.

8. An apparatus for measuring the flow rate of a fluid comprising a pair of horizontal plates in parallel planes defining a space therebetween of very small height, an orifice in a plate opening into the said space, one plate having at least two spaced apart indicia radially positioned from the center of said orifice and a conduit, provided with a measuring liquid which does not wet the plates, leading from said orifice to a source of flowing test fluid.

9. The apparatus of claim 8 in which an electrode is positioned at the indica.

References Cited in the file of this patent

UNITED STATES PATENTS

| 912,393 | Martin | Feb. 16, 1909 |
| 2,320,447 | Raymond | June 1, 1943 |
| 2,660,051 | Dowling | Nov. 24, 1953 |
| 2,892,346 | Sargent | June 30, 1959 |
| 2,912,857 | Cook | Nov. 17, 1959 |